Dec. 31, 1940. A. S. EDMONDS 2,227,301
VEHICLE BRAKE RIGGING DEVICE
Filed Aug. 10, 1938 3 Sheets-Sheet 1

INVENTOR.
ASBURY S. EDMONDS
BY C. P. Goepel
ATTORNEY.

Dec. 31, 1940.　　　　　A. S. EDMONDS　　　　　2,227,301
VEHICLE BRAKE RIGGING DEVICE
Filed Aug. 10, 1938　　　　3 Sheets-Sheet 2
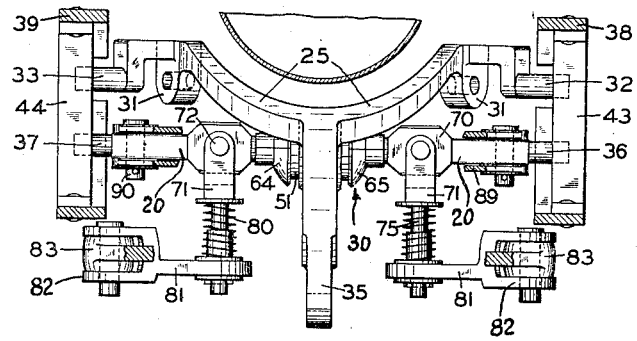
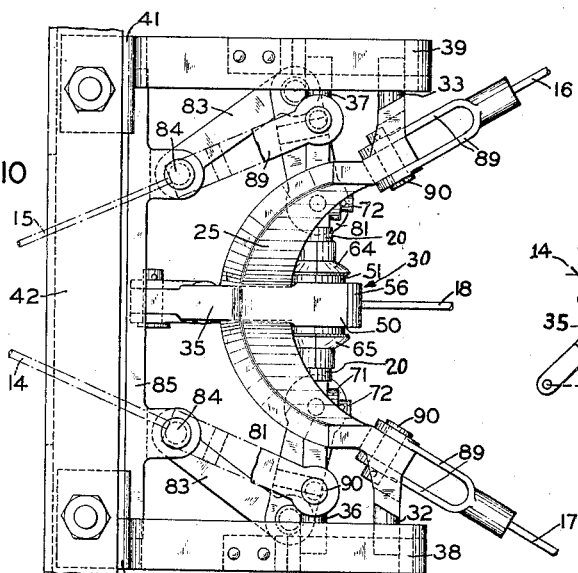
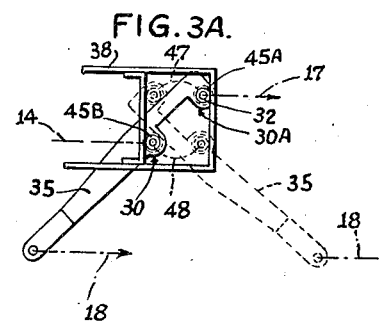
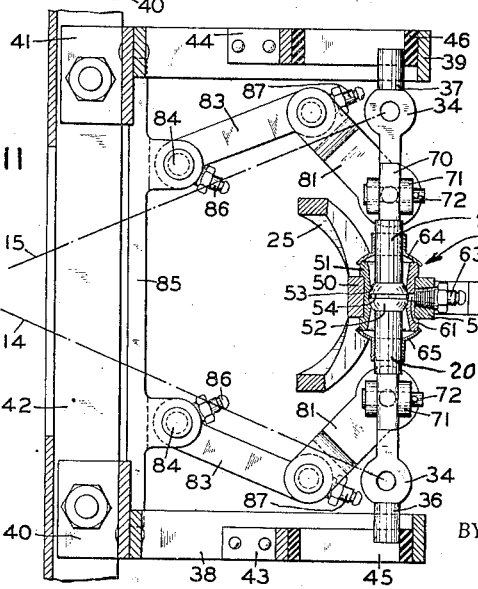
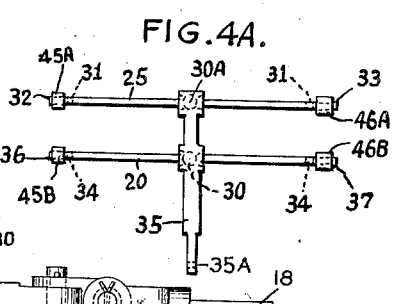
INVENTOR.
ASBURY S. EDMONDS
BY
ATTORNEY.

Dec. 31, 1940. A. S. EDMONDS 2,227,301
VEHICLE BRAKE RIGGING DEVICE
Filed Aug. 10, 1938 3 Sheets-Sheet 3
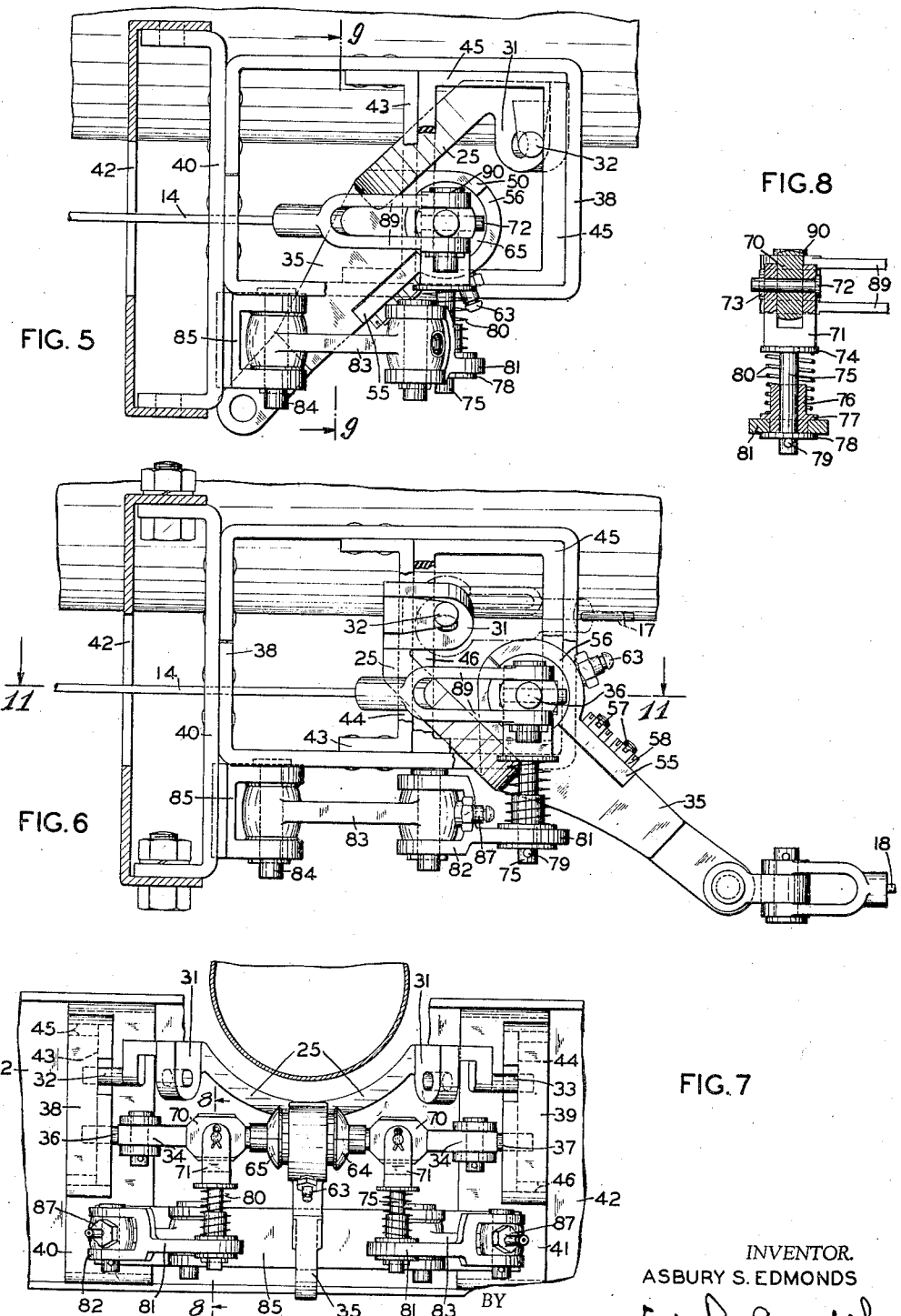
INVENTOR.
ASBURY S. EDMONDS
ATTORNEY.

Patented Dec. 31, 1940

2,227,301

UNITED STATES PATENT OFFICE 2,227,301

VEHICLE BRAKE RIGGING DEVICE

Asbury S. Edmonds, Newcastle, N. Y.

Application August 10, 1938, Serial No. 224,160

14 Claims. (Cl. 188—204)

This invention relates to brake rigging devices, and has for its object to provide an efficient means of distributing braking force to the brakes of the wheels of an automobile, or other vehicle, in desired proportions.

The invention comprises a device embodying a floating primary pivot, which varies in position depending on the actuation of manually operated parts, and upon the relation of coacting parts thereto, and embodying floating secondary pivots each of which varies in position depending on the position of the primary pivot and the actuation of manually operated parts, and upon the relation of the aforesaid coacting parts thereto.

The distributing unit embodying such primary and secondary pivots is suspended by such coacting parts including cables each having one end connected with the braking device of a wheel, the parts of the unit being such that upon their operation the cables are subjected to such further traction as to brake the wheels. The distributing unit embodies also parts connected by a swivel to allow the ends connected with the cables to move independently of each other within prescribed limits.

The improved device is stabilized against jolts, in its position relative to the vehicle, by a support fixed to the vehicle.

The invention will be further described hereinafter in the light of the embodiments thereof shown in the drawings, and will be finally pointed out in the claims.

In the accompanying drawings:

Figure 3A is a similar view of an alternative form of the device shown in Figure 3.

Figure 4A is a similar view of an alternative form of the device shown in Figure 4.

Figure 5 is a side view of an embodiment of the distributing unit in the released or off position;

Figure 6 is a similar view, in the applied position;

Figure 7 is a right hand end view of the distributing unit when the parts are in a position such as shown in Figure 5;

Figure 8 is a vertical section taken on line 8—8 of Figure 7;

Figure 9 is a vertical sectional view seen from line 9—9 of Figure 5;

Figure 10 is a plan view of the distributing unit when in a position corresponding to Figure 5; and Figure 11 is a section plan view taken on line 11—11 of Figure 6.

Similar characters of reference indicate corresponding parts throughout the various views.

Figure 1:
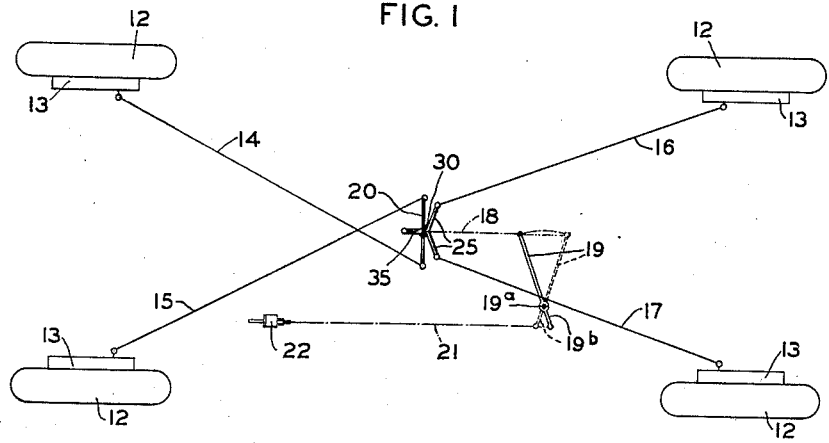
Figure 1 is a diagrammatic plan view of the device in relation to four wheels of an automobile or other vehicle.
Figure 2:
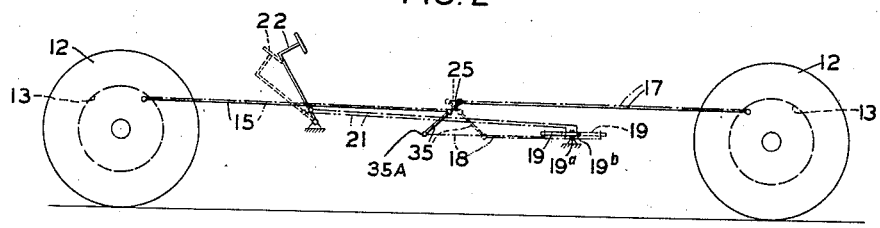
Figure 2 is a side view of the parts shown in Figure 1.

Referring to the drawings, and more particularly to Figures 1 and 2, the usual four wheels 12 of a vehicle are diagrammatically shown, each having a brake device 13 operated by a cable, four cables 14, 15, 16 and 17, being shown. The cables 14 and 15 go to the front wheel brakes and have their ends secured to a cross member 20 by well-known means 89, 90, as shown in Figures 5, 6, 9 and 10, at points 34 of the cross member 20. The cables 16 and 17 go to the rear wheel brakes and have their ends secured by similar well-known means to the respective ends of a cross member 25, at points 31. The cross member 20 and cross member 25 are connected each with an arm 35.

Referring to Figure 4A, it will be seen that cross member 20 is connected with arm 35 by a swivel joint 30 at a median point of the cross member 20 and at an intermediate point between the upper and lower ends of the arm 35, and that cross member 25 is connected with arm 35 by a swivel joint 30A at a median point of cross member 25 and at the upper end of arm 35.

Figure 4:
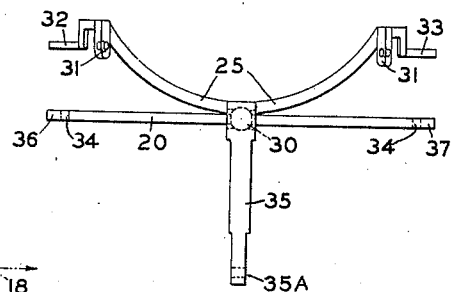
Figure 4 is a diagrammatic view of the distributing unit.

Referring to Figure 4 showing an alternative construction, it will be seen that cross member 20 is connected with arm 35 by a swivel joint 30 at a median point of the cross member 20, and that cross member 25 is connected with arm 35 at a median point of the cross member 25. In this construction (Figure 4) cross member 25 curves upward as it extends outward from its connection with arm 35. Said curvature upward of cross member 25 corresponds perpendicularly to the lowering of the point on arm 35 at which cross member 25 is connected therewith, in Figure 4, as compared with the point on arm 35 at which cross member 25 is connected therewith by swivel joint 30A, in Figure 4A. That is to say, the perpendicular component of cross member 25 in Figure 4 corresponds to that part of arm 35 that is eliminated between the point at which the swivel joint 30A is, in Figure 4A, and the point at which cross member 25 is connected with arm 35, in Figure 4.

The construction thus shown in Figure 4 is adapted to afford clearance, above the center of the device, for any otherwise interfering member of the vehicle, such as a drive shaft, and to enable the device to be elevated higher than it could be with cross member 25 straight as in Figure 4A, thus to afford maximum road clearance. If interference of some member of the vehicle such as a drive shaft, or if road clearance, is not a consideration, then the construction in Figure 4A will be more convenient than that shown in Figure 4, while in the presence of these considerations (drive shaft interference or road clearance requirement) the construction shown in Figure 4 will be found practical.

To this arm 35 is connected at point 35A one end of a cable 18, the other end of which is connected with a lever 19. This lever 19 is pivoted at 19a to some part of the chassis and has a part 19b to the free end of which a cable or rod 21 is connected, which in turn is connected with a foot pedal 22 suitably supported on the chassis.

In Figures 1, 2, 3 and 3A, it will be seen that by pressure applied to the foot pedal 22, the lever arm 19 is moved from full line to dotted line position, whereby the arm 35 being actuated, the cross member 20 is moved to the rear, as, for example, in the path of the arrow 48 (Figure 3), thus pulling the cables 14 and 15, in order to brake the front wheels, and the cross member 25 is shifted at the same time so that the portions 31 are moved to the front, as, for example, in the path of the arrow 47 (Figure 3), thus pulling the cables 16 and 17, in order to brake the rear wheels simultaneously with the braking of the front wheels.

Figure 3:
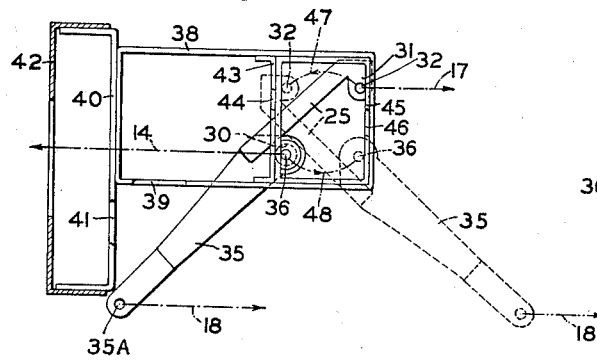
Figure 3 is a detail diagrammatic view of certain of the parts, particularly showing the movement of the distributing unit.

In Figures 3 and 4, there are shown diagrammatically the cross member 20 to which the front cables 14 and 15 are attached, and the cross member 25 to which the rear cables 16 and 17 are attached, as shown in Figure 1. The cross member 25 has extensions 32 and 33. The cross member 20 has extensions 36 and 37. The extensions 32 and 33 of the cross member 25, and the extensions 36 and 37 of the cross member 20 have limits of movement fixed by resilient frames 45 and 46, one at each side of the device. One of these frames, 45, is supported by a frame 38 having a cross bar 43, and the other frame, 46, is supported by a frame 39 having a cross bar 44. The resilient frames 45 and 46 take up the shock, if any, of impact of the extensions 32, 33, 36 and 37 therewith. These outer frames 38 and 39 are secured to frames 40 and 41, which in turn are secured to the chassis 42. The resilient lining forming the frames 45 and 46 may be omitted and the extensions 32, 33, 36 and 37 provided with resilient coverings 45A, 46A, 45B and 46B, in place thereof, as shown in Figures 3A and 4A.

In Figures 3A and 4A, there are shown diagrammatically the cross member 20 adjacent the ends of which the front cables 14 and 15 are attached, and the cross member 25 adjacent the ends of which the rear cables 16 and 17 are attached, in the manner as shown in Figure 1. The cross member 25 has extensions 32 and 33. The cross member 20 has extensions 36 and 37. The extensions 32 and 33 of the cross member 25 have resilient coverings 45A and 46A, and the extensions 36 and 37 of cross member 20 have resilient coverings 45B and 46B. Said resilient covers 45A and 45B have limits of movement fixed by frame 38 having a cross bar 43. Said resilient covers 46A and 46B have limits of movement fixed by frame 39 having cross bar 44.

In Figures 3 and 3A, the full line drawing of arm 35 and cross member 25 with cross member 20 shows these parts in the released or off position, and the dotted line drawing of these parts shows them in the applied position. It will be noted that the extensions 32 and 36, and, of course, the corresponding extensions 33 and 37, float, that is, they have no guide means.

The device described has a floating or suspended primary pivot which varies in position, depending on the actuation of the manually operated parts, as, for instance, the foot pedal 22, and upon the relation of coacting parts, as, for instance, the cables 14, 15, 16 and 17. The device described has also floating secondary pivots each of which varies in position, depending on the position of the primary pivot, and upon the relation of the aforesaid coacting parts, such as the cables 14, 15, 16 and 17.

The device is adapted to automatic compensation between the points 31 and 34, in such manner that on each depression of the foot pedal 22 tractive braking force will be distributed to the several brakes 13 in proportions predetermined, first, as between said front and said rear brakes 13 referring to Figure 4A, in the proportion of the distance (30A to 35A) to the distance (30 to 35A), and, referring to Figure 4, in the proportion of the distance (a point midway on a line between points 31 to 35A) to the distance (30 to 35A), second, as between the right and left brakes of said front pair of brakes 13, referring to Figure 4A, by the length of said cross member 20 between said swivel joint 30 and point 34, to the right, in relation to the length of the corresponding portion of said member 20 to the left, and third, as between the right and left brakes of said rear pair of brakes 13, referring to Figure 4A, by the length of said cross member 25 between 30A and point 31, to the right, in relation to the length of the horizontal component of cross member 25 to the left, referring to Figure 4, by the length of the horizontal component of cross member 25 between its connection with arm 35 and point 31, to the right, in relation to the length of the horizontal component of the corresponding portion of said member 25 to the left.

The principle underlying the device having been pointed out, a practical form is shown in Figures 5 to 11.

The released and applied positions shown in Figure 3 are shown in separate drawings, in Figures 5 and 6.

To obtain said compensation between the points 31 and 34 a construction is shown in the drawings in the form of a swivel joint 30 between said arm 35 and member 20. The arm 35 is provided with a bearing portion 50 having a cap 56 with an extension 55 which is made fast by studs 57 and nuts 58 to the member 35. The portion 50 of the member 35, and the bearing cap 56 to embrace a slit sleeve bearing 51 which has a circumferential groove 53 into which the ball portion 52 of cross member 20 fits. To lubricate this swivel connection, a grease fitting 63 passes through the bearing cap 56. An opening 61 is provided in the sleeve 51, and a circumferential groove 54 is provided on ball portions 52. Grease retaining covers 64 and 65 are arranged one at each side of the sleeve 51 so as to maintain contact with, but not obstruct the movement of the shoulders of the sleeve 51. As heretofore explained, this swivel joint permits independent movement of said points 31 and 34, depending upon the tautness or looseness of any cable.

In the construction shown diagrammatically in Figure 4A, swivel joint 30A, connecting arm 35 and cross member 25, is similar to swivel joint 30, connecting arm 35 and cross member 20.

To stabilize the distributing unit in its suspended position, a resilient support is provided. In the drawings is shown a preferred form for stabilizing mechanism. Reference is made particularly to Figures 5 to 11. The cross member 20 is preferably provided with a flattened portion 70 which enters the U-shaped holder 71, a pin 72 passing through the legs of the U-shaped holder 71 and member 20, held by a replaceable member 73. A rod 75 which preferably is integral with holder 71 passes through a bushing 76. Said bushing 76 seats on the link 81. A helical spring 80 is disposed between a washer 74 and the shoulder 77 of bushing 76, and tends to press upwardly the washer 74 and hence the holder 71. A washer 78 and pin 79 limit the upward movement of holder 71 resulting from said pressure of the spring 80. There are two like devices as just described, one at each side of the swivel connection. The link 81 has a forked end 82, embracing an end of another link 83, which has its supporting end pivotally connected at 84 to a bracket member 85, secured to frames 40 and 41, which in turn are secured to the chassis, (see Figures 5 and 6, 10 and 11). Grease fittings 86 and 87 enable this linkage to be lubricated.

In order to apply the device, it is appropriate to subject the cables 14, 15, 16 and 17 to a suitable preliminary tension, so that the members 25, 35, and 20 may be suspended in proper position by the opposite pulls of the cables, with the extensions 32, 33, 36 and 37 disposed within the inner resilient frames 45 and 46. When so placed, the device is ready for operation.

In order that the movement of points 34 and 31 may be limited to the maximum travel that should be accomplished by each brake cable 14, 15, 16 and 17, the extensions 36 and 37 of member 20, and the extensions 32 and 33 of member 25 are confined within the limits fixed by resilient loops 45 and 46 held in place by the steel frames 38, 43 and 39, 44 (best shown in Figures 3, 6 and 10). If the construction shown in Figures 3A and 4A is used, the resilient covers 45A, 46A, 45B and 46B, which are on extensions 32 and 33, 36 and 37, respectively, are confined within the limits fixed by the steel frames 38, 43, and 39, 44. This described construction for limiting the travel of points 31 and 34 may be embodied in the vehicle itself.

In the event that any one or more of the cables, or other parts of the rigging or braking mechanism between the distributing unit and the respective wheels should break, the member of the distributing unit to which said cable is attached will be confined to the maximum travel allowable to that member, in the manner above described, thus avoiding a dissipation of the braking force imparted by the pedal 22, and thus preventing the other portions of the braking mechanism from being put out of commission thereby. In this way, if the braking mechanism applying to any one or more of the wheels of the vehicle shall become disabled, nevertheless, this improved brake rigging device will continue to distribute the braking force to the brakes remaining operative.

In Figures 1, 10 and 11, the cables 14 and 15 are shown as crossing each other. In similar fashion, the rear cables 16 and 17 may be crossed, or both front and rear cables may be crossed, or neither front nor rear cables crossed, according to convenience.

The improved device is very responsive to the actuating movements, and affords security while at the same time affording means for obtaining the desired distribution of force to the brakes on the several wheels by the automatic compensation of the parts of the device to accommodate such inequalities with wear of the brakes or brake rigging, or of the manual adjustment thereof, as may occur.

In the use of this rigging, assuming that the brake cables 14, 15, 16 and 17 are taut and that the brakes of the several wheels are in good condition, at the inoperative position, the arm 35 will be in substantially the full line position shown in Figures 3, 3A and 5. The depression of the brake pedal 22 will rock the lever arm 35 counterclockwise, from the position shown in full line in Figures 3, 3A and 5, to substantially the dotted line position shown in Figures 3 and 3A and to substantially the full line position shown in Figure 6. If all of the brakes are properly adjusted, then the extensions 32 and 36 will move in substantially opposite directions at the same time within the stop members 45, and the extensions 33 and 37 similarly will move in substantially opposite directions at the same time within the stop member 46, in the construction shown in Figure 3. With the construction shown in 3A, if all the brakes are properly adjusted, then the resilient coverings 45A and 45B will move in substantially opposite directions at the same time within the limits fixed by frame 38, 43, and the resilient coverings 46A and 46B similarly will move in substantially opposite direction at the same time within the limits fixed by frame 39, 44. These stop members 45 and 46 (Figure 3) and frames 38, 43 and 39, 44 (Figure 3A) are arranged so as to permit sufficient movement of the extensions 32 and 36, 33 and 37, and hence of points 31 and 34, Figures 3, 3A, 4 and 4A, to effect the application of full braking force to the several brakes.

However, let us assume by way of example that one of the brake cables, say 14, has been broken. Under this condition, when a pull is applied to the cable 18, the cross member 20 will not stay at right angles to the arm 35, due to the uneven resistance of cables 14 and 15, respectively, and to the swivel connection between the arm 35 and the member 20. The end of the member 20 connected to the cable 14 will first move rearward until the extension 36 is stopped by the rear end of the stop 45, in the construction shown in Figures 3 and 4; while in the constructions shown in Figures 3A and 4A, under similar conditions, the end of the member 20 connected to the cable 14 will move rearward until the resilient covering 45B of the extensions 36 is stopped by the rear end of the frame 38, 43. Further pull on the cable 18 will effect application of a pulling force on the remaining cables 15, 16 and 17.

It will be apparent from the foregoing that if one or more of the brakes are out of adjustment, or one or more of the cables are loose or broken, the remaining brakes may be still operated in the usual manner.

It is obvious that various changes and modifications may be made in the details of construction and design of the above specifically described embodiments of this invention without departing from the spirit thereof, such changes and modifications being restricted only by the scope of the following claims.

What is claimed is:

1. A brake rigging force distributing device comprising a cross member to which the front wheel brakes of a vehicle are attached by connecting means, a cross member to which the rear wheel brakes of said vehicle are attached by connecting means, an arm arranged transversely to said members, connected at one of its ends with the cross member that is attached to the rear brakes at a median point of said cross member, and connected swively with the cross member that is attached to the front brakes, at a median point of said cross member, and means of applying traction at the other end of said arm.

2. In a brake rigging as described in claim 1, lateral extensions of said cross members, and a frame surrounding said cross member extensions that limits the movement of said cross member extensions, both as to released and fully applied positions.

3. In a brake rigging as described, in claim 1, a resilient support under each side of the cross member to which the front wheel brakes are attached, each said support comprising a link pivoting horizontally from said frame, a second link pivoting horizontally from the outer end of the first link, and a spring impelled vertical plunger of limited movement arranged on the outer end of said second link and having its upper end forked to retain said cross member.

4. A brake rigging force distributing device comprising a cross member attached by connecting means to the front wheel brakes of a vehicle, a cross member similarly attached to the rear wheel brakes of said vehicle, an arm extending from one of said members to the other said member, connected to both said members and to at least one of them swively, the other end of the arm being free of the cross members, operating means for applying traction to said end of said arm, said construction being adapted so that said cross member adjacent to said end of said arm, on said application of traction to said arm and hence to said cross member, will move in the direction of said traction as said traction causes operation of said brakes attached to said cross member, and will act simultaneously as a moving pivot on which said arm will rock in transmitting traction in the opposite direction to the other said cross member and hence to the other said brakes thereto attached.

5. A brake rigging means comprising a frame supported by a chassis having a pair of spaced apart stop members, a cross member extending between said stop members and having the ends thereof movable within the limits of said stop members, means connecting a pair of brake operating cables to said cross member, adjacent the opposite ends thereof, an arm rotatably carried by said cross member, a second cross member fixed to said arm, means connecting a second pair of brake operating cables to said second cross member, adjacent the ends thereof, and means connecting said arm to an operating means.

6. A brake rigging means comprising a frame supported by a chassis having a pair of spaced apart stop members, a cross member extending between said stop members and having the ends thereof movable within the limits of said stop members, pairs of link members swingably carried by said frame, means connecting said cross member to said link members in a manner whereby said cross member may have floating movement, means connecting a pair of brake operating cables to said cross member adjacent the opposite ends thereof, an arm rotatably carried by said cross member, a second cross member fixed to said arm, means connecting a second pair of brake operating cables to the ends of said second cross member, and means connecting said arm to an operating means.

7. A brake rigging means comprising a frame supported by a chassis having a pair of spaced apart stop members, a cross member extending between said stop members and having the ends thereof movable in said stop members, means connecting a pair of brake operating cables to said cross member adjacent the opposite ends thereof, an arm rotatably carried by said cross member, a second cross member fixed to said arm, means connecting a second pair of brake operating cables to said second cross member adjacent the ends thereof, extensions carried by said second cross member engaging in said stop members, and means connecting said arm to an operating means.

8. A brake rigging means comprising a frame supported by a chassis having a pair of spaced apart stop members, a cross member extending between said stop members and having the ends thereof movable within the limits of said stop members, said stop members including means to limit the movement of said cross member, means connecting a pair of brake operating cables to said cross member adjacent the opposite ends thereof, an arm rotatably carried by said cross member, a second cross member fixed to said arm, means connecting a second pair of brake operating cables to said second cross member, adjacent the ends thereof, means connecting said arm to an operating means, and extensions carried by said second cross member engaging in said stop members.

9. A brake rigging means comprising a frame supported by a chassis, pairs of link members, means swingably securing one link of each pair to said frame, a cross member, means pivotally securing said cross member adjacent the opposite ends thereof to another link of each pair, means connecting a pair of brake operating cables to said cross member adjacent the ends thereof, an arm swively carried by said cross member intermediate the ends thereof, means connecting said arm to an operating means, a second cross member carried by said arm, means connecting said second cross member, adjacent the ends thereof, to a second pair of brake operating cables, lateral extensions carried by said cross members, and means engageable with said extensions of said cross members to limit the movement thereof.

10. A brake rigging means comprising a frame supported by a chassis, pairs of link members, means swingably securing one link of each pair to said frame, a cross member, means pivotally securing said cross member adjacent the opposite ends thereof to another link of each pair, means connecting a pair of brake operating cables to said cross member adjacent the ends thereof, an arm swively carried by said cross member intermediate the ends thereof, means connecting said arm to an operating means, a second cross member carried by said arm, means connecting said second cross member, adjacent the ends thereof, to a second pair of brake operating cables, lateral extensions carried by said cross members, and spaced apart stop members, engageable with said extensions of said cross members to limit the movement thereof, and resilient means disposed between the stop members and said extensions.

11. A vehicular brake rigging for front and rear brakes, comprising a centrally located connecting member having an upper and lower end, cables attached to the front and rear brakes, means pivotally connecting said rear cables with the upper end of said connecting member, means pivotally connecting said front cables with a point intermediate said upper and lower ends of said connecting member, and means for applying traction at the lower end of said connecting member towards the rear, whereby said upper end of the connecting member is rocked in relation to said intermediate floating pivot point in a direction away from the rear, and said intermediate pivot point is rocked in relation to said floating upper end pivot point away from the front.

12. A vehicular brake rigging force distributing device comprising a cross member, means connecting the device to the front wheel brakes of a vehicle, a second cross member, means connecting the same to the rear wheel brakes of said vehicle, a substantially upright member arranged transversely to said cross members, means connecting said upright member at its upper end with said cross member that is attached to said rear brakes, means of connecting said upright member at a median point thereof with said cross member that is attached to said front brakes, and means of applying traction rearwardly to said upright member at its lower end.

13. A force distributing device for vehicular four-wheel brakes, including front and rear wheel brakes, comprising a member located substantially centrally as to the brakes, means connecting at a median point of said member with the front wheel brakes, means connecting with the rear wheel brakes at its upper end, and means of applying rearward traction to said centrally located member at its lower end so that said means connected with the rear and front brakes, respectively, shall act against each other as opposed floating fulcrums by means of which said traction is divided and applied rearwardly to said means connected with said front brakes, and forwardly to said means connected with said rear brakes.

14. In a vehicular brake rigging for front and rear brakes, the combination of a centrally located connecting member having an upper and lower end, and having a spherical socket in said connecting member, and a transverse member that intersects said connecting member at a point intermediate the ends of said connecting member and midway between the ends of said transverse member, and having a ball member at the middle of said transverse member, to connect with said spherical socket, with cables attached to the front and rear brakes, means of connecting said rear cables with the upper end of said connecting member, means of connecting said front cables with said transverse member at points equidistant from the middle thereof, and means of applying traction at the lower end of said connecting member rearwardly.

ASBURY S. EDMONDS.